United States Patent
Sabelström et al.

(10) Patent No.: US 7,434,893 B2
(45) Date of Patent: Oct. 14, 2008

(54) DEVICE FOR CONTROLLING OR REGULATING AUXILIARY BRAKE TORQUE IN A MOTOR VEHICLE

(75) Inventors: Mats Sabelström, Billdal (SE); Hans Wallgren, Västra Frölunda (SE); Lars Zettergren, Myggenäs (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/710,619

(22) Filed: Jul. 26, 2004

(65) Prior Publication Data

US 2005/0052075 A1    Mar. 10, 2005

Related U.S. Application Data

(63) Continuation of application No. PCT/SE02/02460, filed on Dec. 30, 2002, now abandoned.

(30) Foreign Application Priority Data

Jan. 25, 2002    (SE) .................................. 0200222

(51) Int. Cl.
*B60T 13/74* (2006.01)

(52) U.S. Cl. .............. 303/3; 303/191; 701/90; 477/92; 477/110

(58) Field of Classification Search .............. 303/3, 303/13, 155, 15, 191, 20; 188/290, 271; 477/92, 110, 71, 95; 701/93, 80, 90; 192/216
See application file for complete search history.

(56) References Cited

U.S. PATENT DOCUMENTS

| 5,762,582 A | 6/1998 | Friedrich et al. |
| 5,921,883 A | 7/1999 | Bellinger |
| 6,062,658 A | 5/2000 | Stumpe et al. |

FOREIGN PATENT DOCUMENTS

| DE | 4420116 A1 | 12/1995 |
| EP | 0873924 A1 | 10/1998 |
| WO | WO 95/33631 | * 12/1995 |
| WO | WO 03/064228 | * 8/2003 |

\* cited by examiner

*Primary Examiner*—Pam Rodriguez
(74) *Attorney, Agent, or Firm*—Novak Druce + Quigg LLP

(57) ABSTRACT

Method and arrangement for controlling or regulating total auxiliary brake torque in a motor vehicle. The device includes at least one first auxiliary brake (4) of a first type and at least one second auxiliary brake (4, 6) of a second type that is different from the first type. The second auxiliary brake (4, 6) can take the form of a retarder (4, 6). A control system (10, 17) is provided for controlling or regulating the auxiliary brake. Information is stored in the control system regarding characteristics of the respective auxiliary brake (4, 6) and at least one predefined limit value for maximally permitted auxiliary brake torque. The control system (10, 17) is designed such that, if the limit value is exceeded or if a request is made for the brake force from the auxiliary brakes (4, 6) to be moderated, then this is done by turning down or moderating, in the first place, the brake torque of the retarder (6).

20 Claims, 3 Drawing Sheets

DEVICE FOR CONTROLLING OR REGULATING AUXILIARY BRAKE TORQUE IN A MOTOR VEHICLE

CROSS-REFERENCE TO RELATED APPLICATIONS

The present application is a continuation patent application of International Application No. PCT/SE02/02460 filed 30 Dec. 2002 which was published in English pursuant to Article 21(2) of the Patent Cooperation Treaty, and which claims priority to both Swedish Application No. 0200222-8 filed 25 Jan. 2002. Said applications are expressly incorporated herein by reference in their entireties.

TECHNICAL FIELD

The present invention relates to a device for controlling and/or regulating the total auxiliary brake torque in a vehicle equipped with an engine, drive wheels and transmission components incorporated between the engine and the drive wheels.

BACKGROUND ART

It is known to fit auxiliary brakes on a vehicle that is equipped with an engine and drive wheels, with transmission components incorporated therebetween, and which components include a main transmission with which a driver of the vehicle can select different gears for forward and reverse driving. Auxiliary brakes are utilized primarily in heavier vehicles with a primary aim of saving the service brakes of the vehicle, especially when negotiating long downhill gradients when braking is desirable to maintain fairly constant speed. Through the use of the auxiliary brakes, the service brakes can be kept fresh so that when the vehicle really needs to sharply decelerate, maximum brake force is available from the service brakes. In typical configurations, the service brakes have much more powerful braking capabilities than do the auxiliary brakes, and at least partly because the service brakes are normally fitted on all the wheels of the vehicle. In contrast, the auxiliary brakes normally act only upon the drive wheels.

It is further known to differentiate between so-called primary and secondary auxiliary brakes in a vehicle. Primary and secondary alludes to the positioning of such auxiliary brakes in front of, or behind the main transmission of the vehicle. Examples of primary auxiliary brakes are ISG (Integrated Starter & Generator) and retarders. A retarder is usually of the hydrodynamic retarder- or electromagnetic retarder-type. These type of brakes are normally disposed between the engine and the main transmission. A primary auxiliary brake can also be constituted by various types of engine brakes; for example, compression brakes, exhaust brakes or brakes that utilize the friction of the engine to slow the vehicle. The braking energy in compression and exhaust brakes is converted mainly into heat, which in large part is dissipated via the engine cooling system. It should be noted, however, that a substantial part (approximately forty percent of the braking energy) is carried with the exhaust gases of the vehicle out through the exhaust system of the vehicle. Utilization of the friction of the engine for braking purposes can be regulated by the injection of regulated quantities of fuel into the engine in amounts that permit the output torque from the engine to be, for example, zero. Another option is to uncouple the engine from the other driveline using a clutch that is disposed between the engine and the transmission. In this context, the terminology, "driveline" describes the engine of the vehicle, the drive wheels, and the transmission components coupling the engine to the drive wheels. Other controllable assemblies coupled to the engine, and which impact on the brake force from the engine, can include an engine cooler fan, an air-conditioning unit, a compressed-air compressor, and other ancillary assemblies that may be coupled to the engine.

A secondary auxiliary brake, which is disposed somewhere behind the main transmission of the vehicle, is usually constituted by a retarder of hydrodynamic or electromagnetic type.

When a vehicle is equipped with powerful auxiliary brakes, for example both primary and secondary auxiliary brakes, or a plurality of just the primary type, there is a high risk that the combined brake force is so great that in certain situations some transmission components are exposed to stresses in excess of their maximum torque capacity.

From U.S. Pat. No. 5,921,883, it is known to control brake torque from a compression brake as a function of the speed or engaged gear of the vehicle, with a view to not exceeding the torque capacity of a transmission component upon compression-braking of the vehicle. In an illustrated embodiment, the weight of the vehicle and the gradient of the roadway are taken into account. In the control system of the '883 patent, the torque capacity in case of compression-braking for the weakest transmission component and the characteristics of the compression brake are stored; for example, in a table showing how much brake torque the compression brake produces at a certain revolutionary speed, setting, or the like.

In a situation in which compression braking is imminent, the control system makes a comparison only if the requested brake torque exceeds the torque capacity of the system. Then, if the requested brake torque exceeds the torque capacity of any of the interconnecting components, the control system chooses a value which lies below the maximum torque capacity. Control systems of this nature conduct the comparison only against a table stored in the control system, the values of which are derived in a laboratory environment through simulations or dynamometer tests. The values are often compromises since it would be too expensive to take into account any specific peculiarities of individual vehicles and specific situations. Examples of such vehicle characteristics and situations include when the vehicle is cold and lubricating oils in engine and transmission are viscous and brake differently than at normal running temperature or when various parts in the drive line have worn to an extent that their capacities are reduced, or reducing. Furthermore, there is no feedback utilized in the regulation of the estimation by which the values are verified.

In U.S. Pat. No. 5,921,883, only a single auxiliary compression-type brake is controlled. Nor does the system of the '883 patent take any account of whether the brake force from the auxiliary brake is too high for the friction between the roadway and the drive wheels; that is to say, a comparison to when the vehicle will start to skid.

DE 4420116 (corresponding to WO9533631A1) shows a procedure for controlling auxiliary brake torque in a vehicle. The auxiliary brake is constituted by an engine brake and a retarder. When a temperature sensor senses that the water temperature in the cooling system of the vehicle is too high, the brake action of the hydrodynamic retarder is moderated with a purpose of avoiding overheating.

An auxiliary brake of the hydrodynamic retarder-type usually includes an impeller (rotor) and a turbine wheel (stator). The rotor is fixedly coupled to, for example, the cardan shaft of the vehicle and rotates therewith. The stator is fixedly disposed in a retarder housing in which both the rotor and the stator are enclosed. The retarder housing is connected to an oil reservoir. When oil is squeezed into the retarder housing, it is set in motion by the rotor which squeezes the oil against the stator. Since the stator cannot rotate, the flow of oil is retarded, whereby the rotor and the whole of the vehicle are braked. The brake torque is regulated by the quantity of oil in the retarder housing. The heat which is generated when the oil slows the rotor is usually dissipated via a heat exchanger coupled to the engine cooling system. This means that the retarder requires more cooling capacity from the engine cooling system compared with, for example, the above-stated compression or exhaust brakes in which a large part of the braking energy is outwardly dissipated directly through the exhaust system. The maximum braking capacity of a retarder can usually be utilized only for relatively short periods, owing to the inadequate capacity of the cooling system.

An auxiliary brake of the electromagnetic retarder type usually comprises a stator in the form of electromagnets and a rotor in the form of soft-iron plates. The rotor is coupled to, for example, the cardan shaft of the vehicle and the stator is fixedly mounted in the vehicle. When current is connected to the electromagnets, a brake torque is generated upon the rotor when it rotates. The braking energy is converted into heat owing to the eddy currents formed in the soft-iron plate. In case of lengthy braking, the rotor is heated up so much that the formation of eddy currents is inhibited. This can lead to a reduction in braking capacity, at least in the case of lengthy use and maximum utilization of the capacity of the retarder, and even possibly to the total loss, in principle, of the braking capacity. Also, such electromagnetic retarders are usually cooled by ambient air.

Vehicles equipped with more than one auxiliary brake often have more brake force at their disposal and therefore run a greater risk of exceeding the torque capacity of some transmission components in case of auxiliary braking.

Vehicles equipped with at least two purely primary auxiliary brakes (in which one is typically a hydrodynamic retarder and the other is an auxiliary brake, for example, a compression brake) often enter into situations in which full power from both the auxiliary brakes is unnecessary. An example of such a situation is the case in which lengthy auxiliary braking is employed and the retarder utilizes an unnecessarily large amount of the capacity of the cooling system because the braking energy of the retarder has to be dissipated using the vehicle cooling system. After a relatively short time period, auxiliary braking has to be halted because of overheating of the vehicle's cooling system.

In similar configurations, but where one of the two auxiliary brakes is an electromagnetic retarder, the retarder can become so heated up that there is a risk of a reduction or total loss in braking capacity from the retarder. This can be a problem if the driver, under such conditions, requests maximum auxiliary brake force from both the auxiliary brakes. The available brake force will not be sufficient, and this can lead to the service brakes of the vehicle having to be used instead.

There is therefore a need for a method and (arrangement) device for reciprocally controlling or regulating the auxiliary brakes of a vehicle, in which the type of auxiliary brake and the torque capacity of the transmission components are taken into account. This is a main object of the invention(s) disclosed hereinbelow.

DISCLOSURE OF INVENTION

In at least one embodiment, the presently disclosed invention(s) takes the form of an apparatus or device configured for controlling or regulating total auxiliary brake torque in a motor vehicle. An exemplary incorporating vehicle has transmission components coupled to an engine and drive wheel(s), typically at least two drive wheels. The device comprises (including, but not limited thereto) at least one first auxiliary brake of a first type and at least one second auxiliary brake of a second type and which is different from the first type. The second auxiliary brake is a retarder, and a control system is provided for controlling or regulating the auxiliary brakes. The control system has information stored on the characteristics of the respective auxiliary brake and at least one predefined limit value for maximally permitted auxiliary brake torque. The control system is further configured in such a way that, if the limit value is exceeded, or if a request is made for the brake force from the auxiliary brakes to be moderated, then this is done by turning down or moderating, in the first place, the brake torque of the retarder.

A foremost advantage of such a device configured according to the teachings of the present invention is that the turning down, or moderation of the auxiliary brakes of the retarder type makes it possible, in the case of at least a hydrodynamic retarder, to economize on the cooling capacity of the engine cooling system. This ultimately extends the duration of an auxiliary braking process entailing a certain total brake torque before the engine cooling system's capacity is exceeded (oils over), and, in the case of an electromagnetic retarder, to avoid unnecessary heating of the retarder. According to the invention, the limit value is determined based on one or more transmission components which have the lowest torque capacity in instance of auxiliary braking. An advantage of this is that the invention ensures that the torque capacity for the vehicle transmission is not exceeded, and hence expensive repairs can be avoided.

According to an advantageous embodiment of the device configured according to the invention, the auxiliary brakes are constituted by at least one primary and at least one secondary auxiliary brake. Both the primary and secondary auxiliary brakes contribute to auxiliary braking, and the secondary auxiliary brake is constituted by a retarder. Here, the turning down, or moderation is affected by first turning down or moderating the secondary auxiliary brake.

Apart from the above-stated advantage, another advantage of this is that, as a result of the secondary auxiliary brake being moderated first, certain types of transmissions disposed between the engine and the secondary auxiliary brake are guaranteed to be spared from being wrongly subjected to load, a situation which would occur if the primary auxiliary brake were to be moderated first.

In another embodiment, the effect of the estimated auxiliary brake torque is compared with a measured value; i.e., a value of the auxiliary brake torque, which value is actual to the situation and is preferably measured in respect (compared to) of the weakest transmission component in terms of torque. The auxiliary brake torque is adjusted upwardly or downwardly depending on the measured value. The advantage of this scenario is that auxiliary braking is obtained which is better suited to the situation. By virtue of the measurement, any specific characteristics of the individual vehicle and specific situations (conditions) are taken into account. Such vehicle characteristics and conditions include, for example, when the vehicle is cold and lubricating oils in engine and transmission are viscous and brake differently than at normal running temperature, or when various greater or lesser worn parts in the drive line of the vehicle impact on the rotational resistance.

BRIEF DESCRIPTION OF THE DRAWINGS

The present invention is described in greater detail below with reference to the appended drawings, in which.

MODE FOR THE INVENTION

Figure 1:
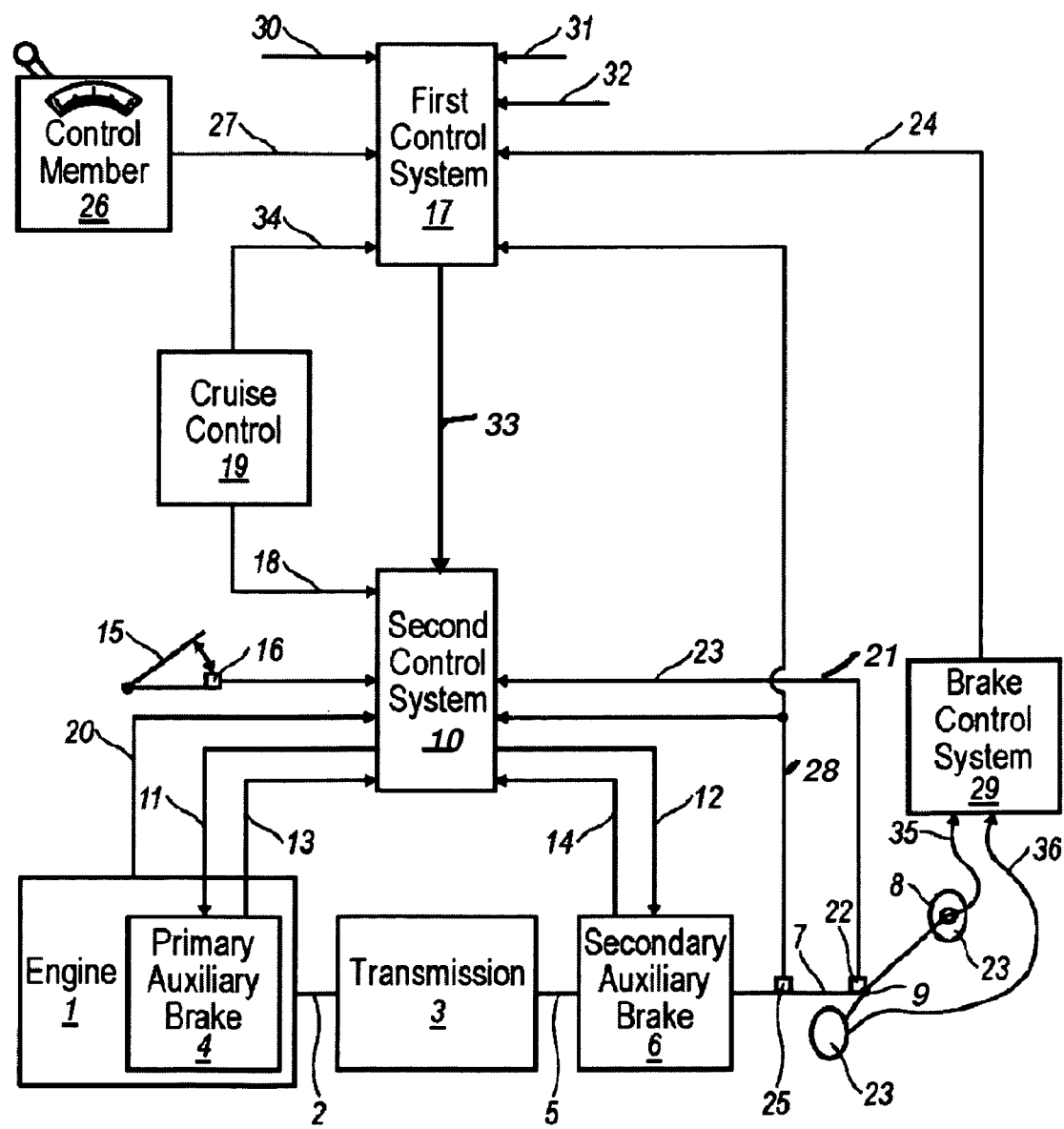
FIG. 1 is a diagrammatic representation of an embodiment of the invention having a control system, a drive line and auxiliary brakes.

FIG. 1 shows a diagrammatic representation of a system configured according to the present invention suitable for controlling and/or regulating an auxiliary brake torque in a vehicle. An engine 1 is connected by an output shaft 2 to a transmission 3 which is the main transmission of the vehicle, and which usually offers the possibility of driving the vehicle both forward and in reverse utilizing many different gear ratios between the engine 1 and drive wheels 8. The transmission 3 can be equipped with auxiliary transmissions (for example a splitter transmission or range-change transmission) in order to obtain more drive gears. In the engine 1, a primary auxiliary brake 4 is disposed. It should be noted that the primary auxiliary brakes can also be disposed between the engine 1 and the transmission 3, or in the transmission on its input shaft. An auxiliary brake of, for example, the compression brake-type is disposed in the engine 1. A retarder is usually disposed on the input shaft of the transmission 3. A secondary auxiliary brake 6 is coupled to the output shaft 5 of the transmission 3. The secondary auxiliary brake is usually of the hydrodynamic or electromagnetic retarder type. To the output shaft of the secondary auxiliary brake is usually coupled the cardan shaft 7 of the vehicle. The cardan shaft 7 relays the drive force from the engine 1 further out to the drive wheels 8 via a rear axle 9. A secondary auxiliary brake 6 is disposed behind the transmission 3 of the vehicle; i.e., between the transmission 3 and the drive wheels 8.

According to the illustrated embodiment of the invention, a control system 10 and 17 is centrally interposed before the auxiliary braking device, and which comprises a first control unit 17 and a second control unit 10. The control units 10, 17 preferably comprise computer control units having microprocessors and memory units. A control computer can be a part of an on-board computer of the vehicle and alternatively, it can form part of some other control vehicle associated arrangement. It can even be a free-standing unit in the vehicle. In order to control or regulate the auxiliary brakes 4 and 6, the control unit 10 gives signals to the respective primary and secondary auxiliary brake 4, 6 via cables (wires or other communication channels) 11 and 12, respectively. The control system receives information on the status of the auxiliary brakes via the cables 13 and 14, respectively.

In the memory unit of the second control unit 10, characteristics of the auxiliary brakes 4 and 6 are stored; for example, the brake force which is normally produced by the respective auxiliary brake 4 and 6 at different revolutionary (rev) speeds and at different temperatures upon the working medium of the respective auxiliary brake and the air temperature around the vehicle. The working medium is normally constituted, in a hydrodynamic retarder, for example, by oil. In the electromagnetic retarder, the working medium is constituted by soft iron in the rotor plates. The air temperature around the vehicle impacts on the prospects for effective cooling of the respective component. The second control unit 10 ensures that the respective auxiliary brake cannot be engaged before the working temperature of the respective auxiliary brake has been reached. Information on the working temperature of the auxiliary brakes is also stored in the second control unit 10.

The second control unit 10 further receives a signal on the position of the gas pedal 15 through the sensor 16. The cable 18 relays signals to the second control unit 10 from the cruise control 19 of the vehicle concerning whether the cruise control orders drive force from the engine 1 and whether the cruise control 19 is engaged or not. The cruise control 19 is of known type, having the functions on/off, set/coast and resume/accelerate. The cable 34 relays signals to the first control unit 17 concerning the vehicle speed which the cruise control 19 is set to maintain. It should be appreciated, however, that it is not necessary to the invention for the vehicle to be equipped with a cruise control.

The cable 20 relays a signal from the engine, concerning the rotation speed of the engine, to the second control unit 10. Signals concerning the rotation speed of the cardan shaft 7 are relayed via the cable 28 to the control units 10 and 17. The rotation speed of the cardan shaft 7 is measured by the sensor 25. The cable 21 relays a signal to the second control unit 10 from a torque transmitter 22. The torque transmitter 22 measures the torque to which the rear axle 9 is exposed in case of auxiliary braking.

On the drive wheels 8 and also other wheels (not shown) of the vehicle, ABS brakes (brakes with anti-locking system) with ABS brake sensors 23 are fitted. From the ABS brake sensors, a signal concerning the rotation speed of the drive wheels is relayed via cables 35 and 36. The service brake control system 29 of the vehicle compares the rotation speed of the various wheels of the vehicle and registers whether any of the wheels of the vehicle are skidding, i.e. whether the difference between the rotation speed of the various wheels is too large. If skidding is present, a signal is given via the cable 24 to the first control unit 17 that any current auxiliary braking must totally cease or, alternatively, that the auxiliary brake torque must be turned down or moderated to the point where the vehicle regains grip and stability.

Through the control member 26 and the cable 27, coupled to the first control unit 17, the driver of the vehicle has the possibility of manually selecting different levels of auxiliary brake torque, alternatively of being able to select a certain deceleration. A given brake torque gives varying deceleration, depending on road gradient, road resistance and the like, while the deceleration option gives a certain deceleration, in principle, regardless of the conditions.

The cable 30 relays a signal from a gradient transmitter (not shown) to the first control unit 17 concerning the gradient of the roadway. The cable 31 relays a signal from a weight sensor (not shown) to the first control unit 17 concerning the overall weight of the vehicle. A known alternative or supplement to the road gradient transmitter and the weight sensor is to measure the road resistance of the vehicle. By road resistance, a value is meant that is calculated on the basis of measured parameters such as: engine torque, vehicle acceleration/deceleration and the current mass of the vehicle. Altogether, the road resistance value can be used as an indication of road gradient, roll resistance and any tail wind or head wind. The road resistance signal is relayed via the cable 32.

The speed of the vehicle is obtained by measuring the rotation speed of the cardan shaft 7; i.e., using the sensor 25.

The gear ratio in the rear axle 9 is usually permanent, and hence the vehicle speed is given by measurement of the rotation speed of the cardan shaft.

Based on the information relayed via the cables 27, 28, 30, 31, 32, 34, and depending on whether cruise control is engaged and set to a certain vehicle speed or whether the choice of brake torque/deceleration level has been made via the control member 26, the first control unit 17 calculates in a known manner a value of the total auxiliary brake torque required depending on: the conditions outside the vehicle, the instantaneous speed of the vehicle and the auxiliary braking level selected by the driver via the control member 26 or selected vehicle speed via the cruise control 19. The total auxiliary brake torque is the requested auxiliary brake torque.

The cable 33 gives information from the first control unit 17 to the second control unit 10 concerning the requested total auxiliary brake torque.

All sensors such as torque transmitters, rotation speed meters, and the like are of known type and will not be described in any further detail herein.

Figure 2:
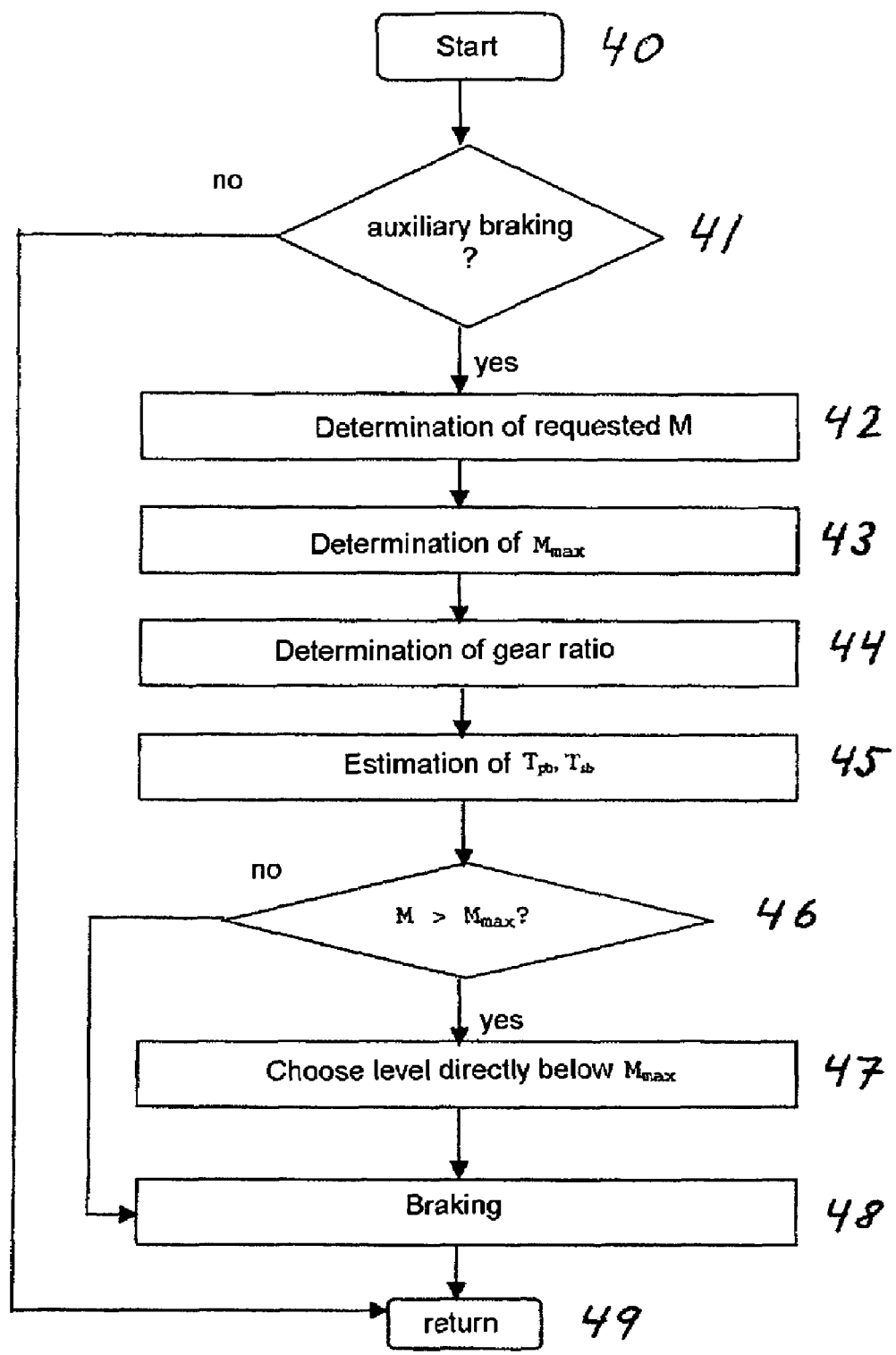
FIG. 2 is a flow chart demonstrating one embodiment of a method conducted according to the present invention, for controlling the auxiliary brake torque.

In FIG. 2, one version of the steps of the inventive method are illustrated, and by which the second control unit 10 controls the total auxiliary brake torque in a motor vehicle. The method begins with the step 40, and in step 41, it is determined whether the conditions for auxiliary braking are met. This means that the second control unit 10 checks whether the gas pedal 15 is in a fully released position. The auxiliary braking is blocked for as long as the driver accelerates; i.e. is fully or partially depressing the gas pedal 15. In this instance, the second control unit 10 also checks whether the cruise control 19 is signalling to the engine control system (not shown) to provide the motor with some quantity of fuel; i.e., that driving force that is demanded by the cruise control 19. If the above conditions are met; i.e., no signal for more fuel to the engine is present, then the execution continues to step 42. If the conditions in 41 are not met, then the execution continues to step 49; i.e., back in starting or call position 40. In step 42, the second control unit 10 determines the total auxiliary brake torque which is requested by the first control unit 17 via the cable 33.

In step 43, a limit value is determined for maximally permitted brake torque from the auxiliary brakes, based on torque capacity for a transmission component which has the lowest capacity in case of auxiliary braking. In the illustrative embodiment shown in FIG. 1, the weakest transmission component is the rear axle 9. The limit value is predetermined by laboratory tests and is stored in the memory unit in the second control unit 10. Most commonly, some component between the transmission 3 and the drive wheels 8 determines the limit value, which, in the illustrative embodiment shown, is determined by the rear axle 9.

In step 44, the second control unit 10 determines the gear ratio between the engine 1 and the drive wheels 8, preferably by measuring the rotation speed of the engine 1 and the rotation speed of the cardan shaft 7. The gear ratio in the rear axle 9 is usually permanent and hence the gear ratio between the engine 1 and the drive wheels 8 is known. An alternative to ascertaining the gear ratio is to provide a sensor which detects a position of a gear selector (not shown) disposed on the transmission 3. The gear ratio between the engine 1 and the drive wheels 8 is only required to be known if the vehicle is equipped with at least one primary auxiliary brake.

In step 45, the second control unit 10 estimates (for example, calculates) the size of the brake torque which the respective auxiliary brake needs to produce to achieve the requested total auxiliary brake torque. The equation for this includes the instantaneous gear ratio and the total auxiliary brake torque requested by the first control unit 17. The equation is exemplarily represented by the formula $M=((T_{ed}+T_{pb})\times(\text{gear ratio})+T_{sb})$ in which: $T_{ed}$=the engine torque (in principle, the basic friction of the engine, plus any other assemblies coupled to the engine, such as, for example, compressed-air compressor, and the like); $T_{pb}$=brake torque from the primary auxiliary brake 4, which, as previously, can be built into the engine 1 or can be free-standing; $T_{sb}$=brake torque from the secondary auxiliary brake 6; Gear ratio=instantaneous gear ratio between the engine 1 and the drive wheels 8; and M=the total auxiliary brake torque requested by the first control unit 17.

The distribution of brake torque which the respective auxiliary brake needs to produce in order to achieve a certain total brake torque is predetermined and is stored in the memory unit of the second control unit 10. The distribution is affected by the status and characteristics of the respective auxiliary brake as described herein.

In step 46, the requested total auxiliary brake torque is compared with the limit value. If the requested auxiliary brake torque exceeds the limit value, the execution proceeds to step 47; that is, the second control unit 10 chooses a new total auxiliary brake torque, the torque level of which lies directly below the torque level of the limit value. According to the invention, the turning down (reduction) of this new total auxiliary brake torque is effected by turning down the brake torque of the secondary auxiliary brake 6. The amount by which the secondary auxiliary brake has to be turned down is calculated by the auxiliary brake torque M being chosen somewhat lower than the limit value ($M_{max}$) and by $T_{sb}$ being isolated out and calculated. Remaining included variables in the equation are given as above. After step 47, auxiliary braking takes place in step 48 according to the chosen brake torque in step 47. If the requested total auxiliary brake torque, on the other hand, does not exceed the limit value, then the execution continues to step 48, i.e. the auxiliary braking is effected according to the chosen brake torque.

The equivalent occurs in a vehicle equipped with just primary auxiliary brakes, in which one of at least two auxiliary brakes, but not the second one(s), is constituted by a retarder. In this kind of realization (version of the invention), the retarder is turned down in step 47.

As above, the steps are executed in the second control unit 10 continuously according to predetermined time intervals, which are usually limited by the computing capacity of the microprocessors. Correspondingly, the first control unit 17 continuously calculates a requested total auxiliary brake torque on the basis of given assumptions. In this way, the total auxiliary brake torque is continuously controlled throughout a current auxiliary braking.

In order to implement the method for controlling the auxiliary brake torque according to FIG. 2, the device in FIG. 1 does not need to be equipped with the torque transmitter 22.

Figure 3:
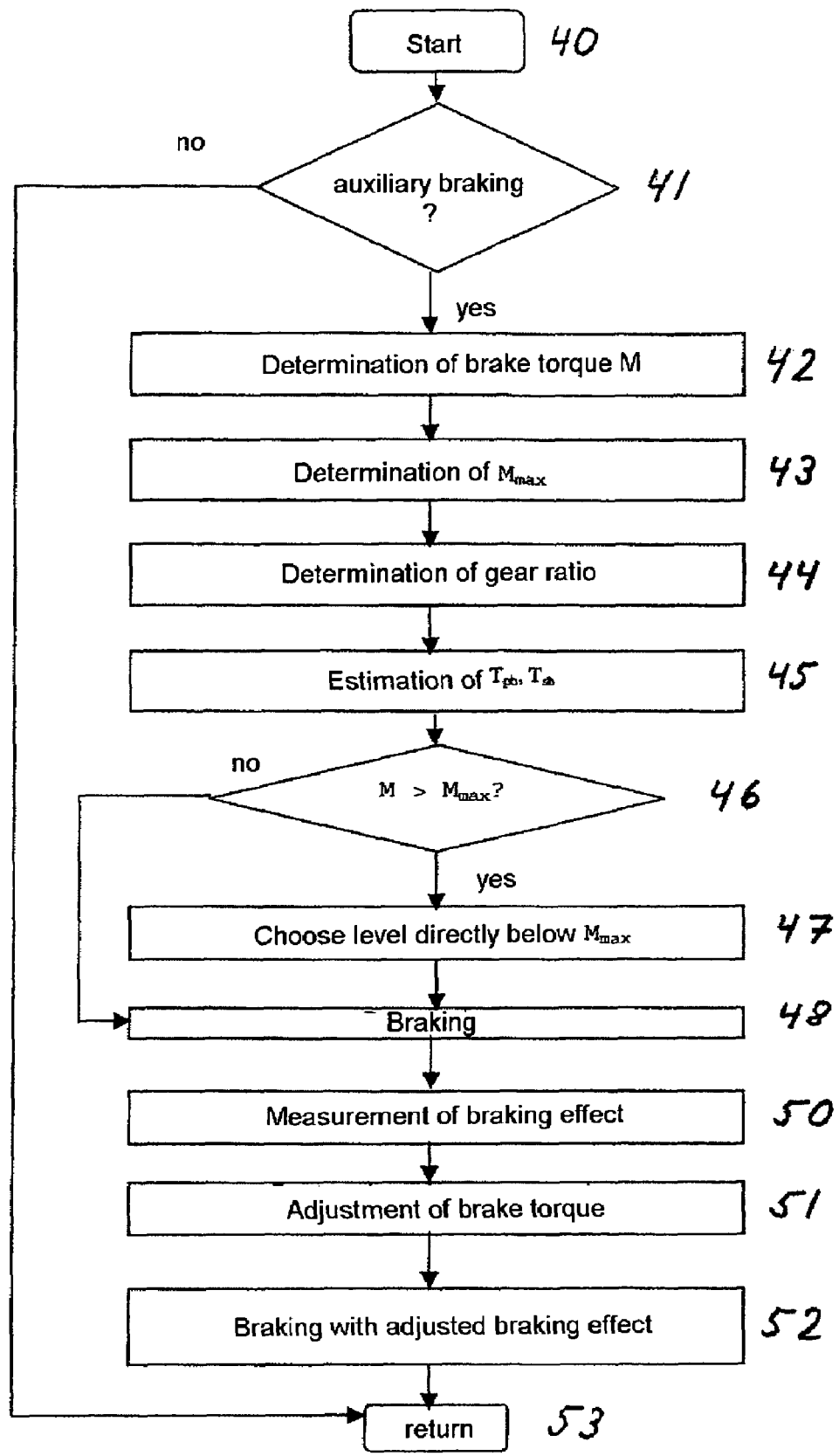
FIG. 3 is a flow chart demonstrating another embodiment of the present inventionve method for regulating auxiliary brake torque in a vehicle.

In FIG. 3, a modified version of the presently disclosed inventive method is illustrated, as compared to that of FIG. 2. The case of FIG. 3, the method starts with the step 40 and is identical to the embodiment according to FIG. 2, up to and including step 48. According to this version of the invention, however, the number of steps is increased with a view to utilizing the torque transmitter 22, and hence obtaining a total auxiliary brake torque which is better suited to the auxiliary braking situation; that is, a regulation of the auxiliary brake torque.

In step 50, the actual auxiliary brake torque is measured by the torque transmitter 22. In step 51, the auxiliary brake torque is adjusted, according to the final stage 48, upward or downward depending on the measured value in step 50, and depending on the size of the measured value relative to the limit value. The auxiliary brake torque is adjusted so that it ends up precisely below the limit value. In step 52, the auxiliary braking continues, but with the possibility of an adjusted brake torque.

In this embodiment, during the continued auxiliary braking (i.e. execution number two and the following executions), account is taken of the signal from the service brake control system 29 via the cable 24. If the service brake control system registers skidding, then a ramping down of the requested total auxiliary brake torque from the control unit 17 will be automatically initiated until the service brake control system 29 no longer registers skidding. The different levels of the ramping down are predetermined and stored in the memory unit in the control unit 17. The control unit 17 ramps down on the basis of the requested total auxiliary brake torques of the preceding execution. In this way, the requested total auxiliary brake torque is also regulated with due regard to the state of the road. In the next execution in the control unit 17, the next step in the ramping down is performed, if so required. The influence of the service brake control system 29 implies, in the final analysis, a gradual moderation of the brake torque of the secondary auxiliary brake. Moderation of the retarder 6 (the secondary auxiliary brake) proceeds with a ramping down in the amount of generated braking torque which continues for each new execution in the control unit 10 until the service brake control system 29 registers that the vehicle wheels have stopped skidding.

Viewed overall, the auxiliary brake torque is controlled and regulated in steps 48 and/or 51 based on: a request of the driver; a request of the cruise control; a torque capacity of the transmission component; the nature of the road base; the surrounding topology and road resistance; and/or the peculiarities of the individual vehicle, temperatures, and the like presently existing in the drive line.

If the situation were to arise in which the retarder 6 has been maximally turned down or moderated (i.e. the retarder 6 is fully closed off, and this is definitely not sufficient to get below the limit value), then the second control unit 10 will also begin to turn down or moderate the braking effect of the primary auxiliary brake. The equivalent applies if the vehicle is equipped with just primary auxiliary brakes.

In exemplary devices configured according to the teachings of the invention, the brake torque in the various auxiliary brakes is built up parallel to the requested or estimated brake level. When the brake torque has to be turned down or moderated, this is effected by moderation, in the first place, of the retarder in the auxiliary brake system.

It should be appreciated that the invention is not limited to the embodiments described above. The respective primary and secondary auxiliary brakes can comprise, for example, two or more primary and secondary auxiliary brakes respectively. Alternatively, the auxiliary brakes can comprise only two or more primary auxiliary brakes.

The cables or the information channels in the embodiments described above are preferably of the electric cable or optic cable type. Wireless information transfer is also possible. The information channels can, in turn, form part of the data bus system of the vehicle. The the invention is not, however, limited to such signal-relaying devices.

The invention claimed is:

1. A device for controlling or regulating total auxiliary brake torque in a motor vehicle, wherein said device comprises:
    transmission components (2, 3, 5, 7, 9) coupled to an engine (1) and at least two drive wheels (8);
    at least one first auxiliary brake (4) and at least one second auxiliary brake (6) that is different from the first, the second auxiliary brake (6) being a retarder (6); and
    a control system (10, 17) for controlling the first and second auxiliary brakes and in which information on characteristics of the respective auxiliary brakes (4, 6) and at least one predefined limit value for maximally permitted auxiliary brake torque are stored, the control system (10, 17) being configured so that, if one of (1) the predefined limit value is exceeded and (2) a request is made for a brake force from the auxiliary brakes (4, 6) to be moderated, the control system (10, 17) effects an adjustment to the magnitude of braking torque imposed by the retarder (6).

2. The device as recited in claim 1, wherein said adjustment to the magnitude of braking torque imposed by the retarder (6) is a turning down of the magnitude of braking torque imposed by the retarder (6).

3. The device as recited in claim 1, wherein said adjustment to the magnitude of braking torque imposed by the retarder (6) is a moderation of the magnitude of braking torque imposed by the retarder (6).

4. The device as recited in any one of claims 1-3, wherein, in the case where the adjustment to the magnitude of braking torque imposed by the retarder (6) is not sufficient to get below the limit value, the control system (10, 17) also effects an adjustment to the magnitude of braking torque imposed by the first auxiliary brake (4).

5. The device as recited in claim 4, wherein said adjustment to the magnitude of braking torque imposed by the first auxiliary brake (4) is a turning down of the magnitude of braking torque imposed by the first auxiliary brake (4).

6. The device as recited in claim 4, wherein said adjustment to the magnitude of braking torque imposed by the first auxiliary brake (4) is a moderation of the magnitude of braking torque imposed by the first auxiliary brake (4).

7. The device as recited in any one of claims 1-3, wherein the first auxiliary brake (4) is configured as an engine brake (4).

8. The device as recited in any one of claims 1-3, wherein the first auxiliary brake (4) is configured as an Integrated Starter Generator.

9. The device as recited in any one of claims 1-3, wherein the second auxiliary brake (6) is configured as a hydrodynamic retarder (6) that utilizes a cooling system of the vehicle to cool the hydrodynamic retarder (6).

10. The device as recited in any one of claims 1-3, wherein the second auxiliary brake (6) is configured as an electromagnetic retarder (6) that acquires worsened braking effect with increased working temperature.

11. The device as recited in any one of claims 1-3, wherein a transmission component (2, 3, 5, 7, 9) having a lowest torque capacity determines the predefined limit value.

12. The device as recited in claim 11, further comprising:
    a torque-measuring device (22) coupled to the control system (10), said torque-measuring device (22) being fitted to the transmission component having the lowest torque capacity.

13. The device as recited in any one of claims 1-3, further comprising:
    information channels coupled to the control system (17) and through which the control system (17) receives information on at least one of: vehicle speed (25), gear ratio (20, 25), vehicle weight (30), road gradient (31) and road resistance (32).

14. A device for controlling or regulating total auxiliary brake torque in a motor vehicle, having transmission components (2, 3, 5, 7, 9) coupled to an engine (1) and at least two drive wheels (8) coupled to the transmission components (2, 3, 5, 7, 9), the device comprising at least one second auxiliary brake (6), different from a first auxiliary brake (4), the second auxiliary brake (6) being a retarder (6), a control system (10, 17) for controlling or regulating the auxiliary brakes (4, 6), in which control system are stored information on the characteristics of the auxiliary brakes (4, 6) and at least one predefined limit value for maximally permitted auxiliary brake torque, characterized in that the control system (10, 17) is designed such that, if the limit value is exceeded or if a request is made for the brake force from the auxiliary brakes (4, 6) to be moderated then this is done by turning down or moderating, in the first place, the brake torque of the retarder (6).

15. The device as claimed in claim 14, characterized in that if the turning down or moderation of the retarder (6) is not sufficient to get below the limit value, the control system (10, 17) is set up to turn down or moderate also the first auxiliary brake (4).

16. The device as claimed in claim 14, characterized in that the first auxiliary brake is constituted by an engine brake (4) or ISG (Integrated Starter Generator).

17. The device as claimed in claim 14, characterized in that the second auxiliary brake is constituted by a hydrodynamic retarder (6), which utilizes the vehicle cooling system to cool the hydrodynamic retarder (6), which can acquire worsened braking effect with increased working temperature.

18. The device as claimed in claim 14, characterized in that at least one primary auxiliary brake (4) and at least one secondary auxiliary brake (6) constitute the auxiliary brakes (4, 6) and in that a retarder (6) constitutes the secondary auxiliary brake and in that the control system (10, 17) is set up to turn down or moderate the secondary auxiliary brake if the limit value is exceeded.

19. The device as claimed in claim 14, characterized in that at least one of said transmission components is a transmission component (9) with lowest torque capacity, which component determines the limit value.

20. The device as claimed in claim 14, characterized in that a torque-measuring device (22) is coupled to the control system (10), which measuring device is fitted to any one (9) of the transmission components with lowest torque capacity.

* * * * *